(12) United States Patent
Zunger

(10) Patent No.: US 7,913,163 B1
(45) Date of Patent: Mar. 22, 2011

(54) DETERMINING SEMANTICALLY DISTINCT REGIONS OF A DOCUMENT

(75) Inventor: Yonatan Zunger, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1258 days.

(21) Appl. No.: 10/947,702

(22) Filed: Sep. 22, 2004

(51) Int. Cl.
*G06F 17/00* (2006.01)

(52) U.S. Cl. ........................... 715/243; 715/234
(58) Field of Classification Search .................. 715/243, 715/234
See application file for complete search history.

(56) References Cited

U.S. PATENT DOCUMENTS

| | | | |
|---|---|---|---|
| 6,233,571 B1 * | 5/2001 | Egger et al. | 707/2 |
| 6,356,899 B1 * | 3/2002 | Chakrabarti et al. | 707/5 |
| 6,486,898 B1 * | 11/2002 | Martino et al. | 715/853 |
| 6,901,575 B2 * | 5/2005 | Wu et al. | 716/19 |
| 6,948,119 B1 * | 9/2005 | Farmer et al. | 715/206 |

OTHER PUBLICATIONS

Cohen et al., "A Flexible Learning System for Wrapping Tables and Lists in HTML Documents", WWW2002, May 2002, published by ACM, p. 232-241.*
Lee, et al., "Parameter-Free Geometric Document Layout Analysis", IEEE Transactions on Pattern Analysis and Machine Intelligence, vol. 23, No. 11, Nov. 2001, p. 1240-1256.*

* cited by examiner

*Primary Examiner* — Amelia Rutledge
(74) *Attorney, Agent, or Firm* — Morgan, Lewis & Bockius LLP

(57) ABSTRACT

A structured document is translated into an initial hierarchical data structure in accordance with syntactic elements defined in the structured document. The initial hierarchical data structure includes a plurality of nodes, and each node corresponds to one of the syntactic elements. The method then annotates a node with a set of attributes including geometric parameters of semantic elements in the structured document that are associated with the node in accordance with a pseudo-rendering of the structured document. Finally, the method merges the nodes in the initial hierarchical data structure into a tree of merged nodes in accordance with their respective attributes and a set of predefined rules such that each merged node is associated with a semantically distinct region of the pseudo-rendered document. The predefined rules include rules for merging nodes associated with semantic elements that have nearby positions and/or compatible attributes in the pseudo-rendered document.

22 Claims, 13 Drawing Sheets

| Horizontal Distance | 1 | 2 |
|---|---|---|
| # of matching pairs | 5 | 2 |
| Total # of pairs | 6 | 3 |
| Percentage | 83% | 67% |

| Vertical Distance | 1 | 2 |
|---|---|---|
| # of matching pairs | 5 | 2 |
| Total # of pairs | 6 | 3 |
| Percentage | 83% | 67% |

US 7,913,163 B1

DETERMINING SEMANTICALLY DISTINCT REGIONS OF A DOCUMENT

FIELD OF THE INVENTION

The present invention relates generally to the field of computational linguistics, and in particular, to a system and method of determining semantically distinct regions of a document.

BACKGROUND OF THE INVENTION

A document displayed on a computer monitor typically comprises multiple semantically distinct regions, such as a header, a footer or a sidebar, each region including one or more semantic elements such as text paragraphs, pictures, advertisement blocks or navigational links, etc. Each section occupies a unique location on the computer monitor. For example, the text paragraphs and pictures are usually the focus of the viewer and are therefore positioned at the center of the computer monitor, which is the most eye-catching part of the computer monitor. In contrast, the footer often contains boilerplate items that are deemed less important from a viewer's perspective, e.g., legal disclaimer, copyright notice or timestamp, and is therefore located at the bottom of the document.

Even though a semantically distinct region in a document is easily recognizable on a computer monitor by human eyes, it may be a difficult task for a computer program to identify its counterpart in a file that renders the document on the computer monitor. For example, a webpage displayed in a web browser window is typically created from a hypertext markup language (HTML) file by the web browser. The HTML file usually includes multiple syntactic elements, e.g., <TABLE> and </TABLE>, that instruct the web browser on how to display different components in the webpage in a specific manner. But it rarely occurs that, for instance, one pair of <TABLE> and </TABLE> corresponds to an actual table in the webpage. More than that, a semantically distinct region of a document, e.g., a sidebar of navigational links or a column of advertisement blocks, is often associated with multiple syntactic elements, but the corresponding HTML file does not group those elements together nor does it provide any other structure for identifying the plurality of elements that belong to a semantically distinct region.

SUMMARY

In a first embodiment of the present invention, a method for partitioning a structured document translates the document into an initial hierarchical data structure in accordance with syntactic elements defined in the structured document. The initial hierarchical data structure includes a plurality of nodes, and each node corresponds to one of the syntactic elements. The method then annotates a node with a set of attributes including geometric parameters of semantic elements in the structured document that are associated with the node in accordance with a pseudo-rendering of the structured document. Finally, the method merges the nodes in the initial hierarchical data structure into a tree of merged nodes in accordance with their respective attributes and a set of predefined rules such that each merged node is associated with a semantically distinct region of the pseudo-rendered document. The predefined rules include rules for merging nodes associated with semantic elements that have nearby positions and/or compatible attributes in the pseudo-rendered document.

In a second embodiment of the present invention, a method for partitioning a document pseudo-renders the document in accordance with syntactic elements defined in the document and generates an initial hierarchical data structure for the document. The initial hierarchical data structure includes a plurality of nodes corresponding to the syntactic elements of the document, and each node has an associated set of attributes derived from the pseudo-rendered document. The method then converts the initial hierarchical data structure into a final hierarchical data structure in accordance with a set of predefined rules. The final hierarchical data structure includes multiple chunks, each chunk corresponding to a semantically distinct region of the pseudo-rendered document.

The pseudo-rendering of a document determines the approximate position and size of each element of the document, without necessarily performing a full rendering of the document. A primary purpose of pseudo-rendering is to determine geometric information for each element of the document and to associate that geometric information with the document's elements in a hierarchical data structure, thereby providing the factual basis for identifying semantically distinct regions of the document and for assigning elements of the document to those regions.

In a third embodiment of the present invention, a method of partitioning a document into semantically distinct regions first generates a hierarchical data structure for the document. The hierarchical data structure includes a plurality of nodes that are associated with a plurality of syntactic elements of the document, each node having a set of geometric parameters characterizing one or more semantic elements in the document. The method then merges the nodes into one or more semantically distinct regions in accordance with their respective sets of geometric parameters and a set of predefined rules, each section including at least one of the semantic elements in the document.

DESCRIPTION OF EMBODIMENTS

Overview

Figure 1:
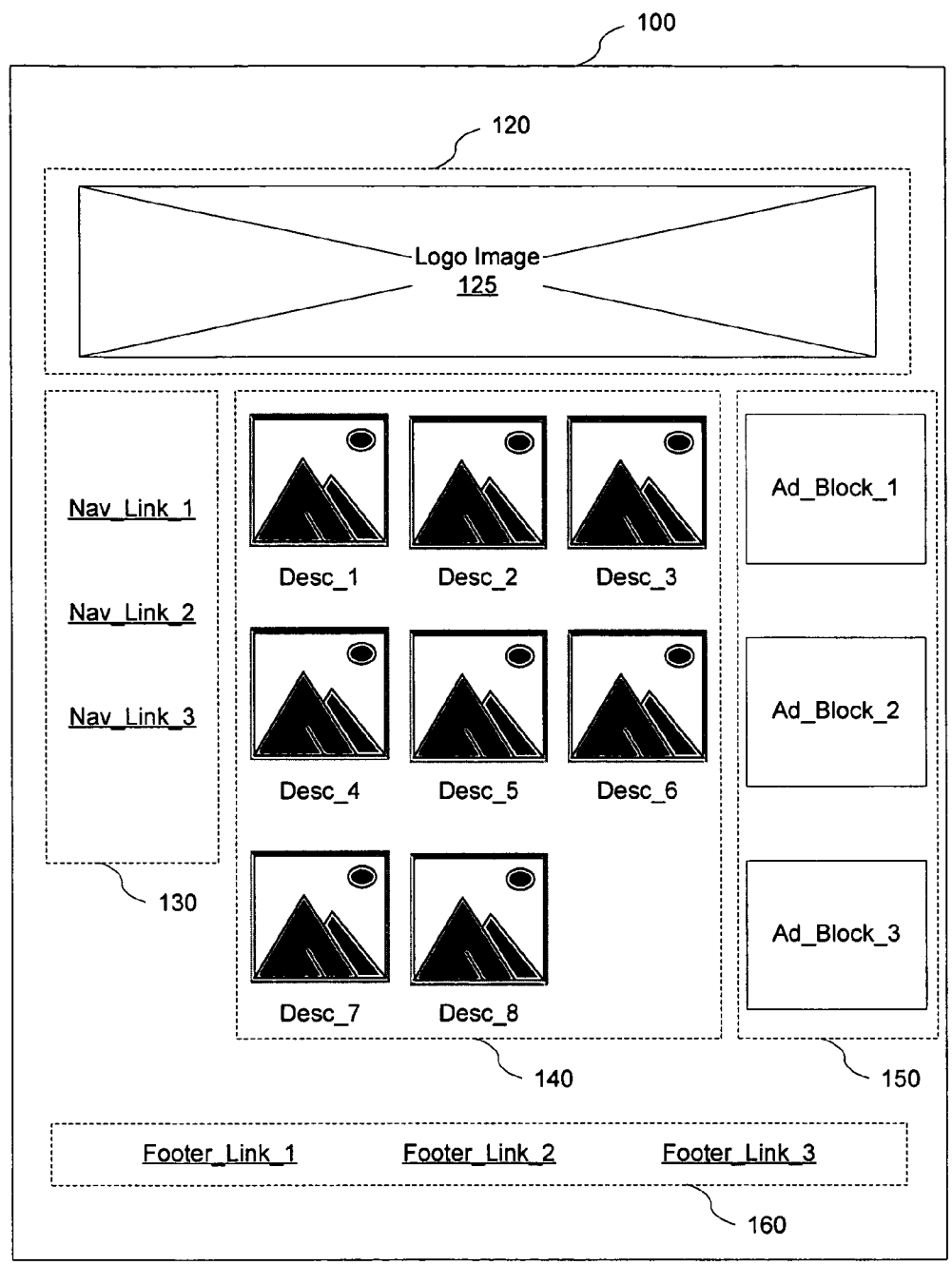
FIG. 1 is a block diagram illustrating an exemplary webpage displayed in a web browser window.

FIG. 1 is a block diagram illustrating an exemplary webpage 100 displayed in a web browser window. A human being visiting the webpage 100 can easily divide it into multiple semantically distinct regions as indicated by the dash-line rectangles. At the top of the webpage is a header 120 that carries a logo image 125 of a company. There are three sections sitting side by side right below the header 120, including a left hand side (LHS) sidebar 130, an array of image blocks 140 in the middle and a right hand side (RHS) sidebar 150. A footer 160 at the bottom of the webpage includes one or more links pointing to other relevant documents, such as company information, privacy policy, etc.

The LHS sidebar 130 includes multiple navigational links and these links are typically on-site links that guide a viewer from this webpage to other web pages at the same website. For example, if this webpage is a homepage of a newspaper, different navigational links may be associated with different topics, e.g., politics, sports, market, etc. A viewer can switch from one topic to another by clicking on an associated navigational link.

The location containing the image blocks 140 typically carries the primary content of a webpage since it is at or near the center of the webpage. In this example, the primary content is a photo album that includes multiple pictures, each picture associated with a short sentence (denoted by "Desc_1," "Desc_2," . . . in FIG. 1) describing the picture, e.g., where the picture is taken or who are in the picture.

In this example, the RHS sidebar 150 includes one or more advertisement blocks (Ad_Block_1, Ad_Block_2, etc.). The advertisement blocks are vertically separated. Each block may be contain an image and/or text that conveys commercial information. For example, an advertisement block may contain a promotional offer from a sponsor that creates and sells paper copies for digital images. An advertisement block is typically associated with an off-site link if the sponsor of the advertisement has its own website. A viewer who is interested in a particular piece of commercial information can jump to its sponsor's website by clicking on the corresponding advertisement block.

Generally speaking, since a semantically distinct region occupies a unique location in the webpage 100, it carries a unique weight from a viewer's perspective. What is of most interest to the viewer is probably the image blocks 140 located at the center of the webpage, since it contains the primary content of the webpage 100. By contrast, what is of least interest is probably the footer 150, because information associated with the footer 160 is predominantly boilerplate terms that are the same across the entire website.

Figure 2:
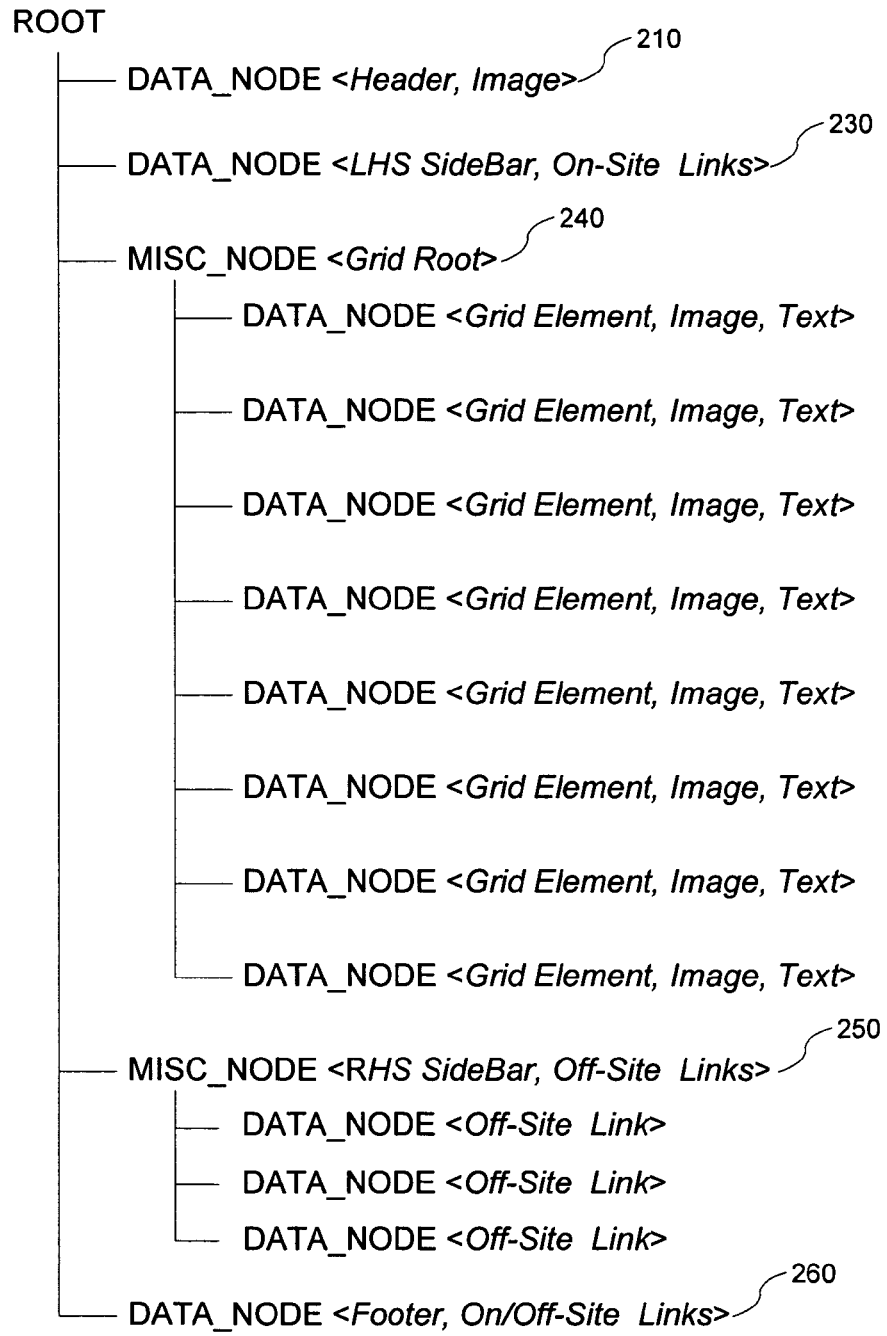
FIG. 2 depicts a hierarchical data structure, i.e., a chunk tree, of the exemplary webpage according to one embodiment of the present invention.

FIG. 2 depicts a hierarchical data structure, herein called a chunk tree 200, of the webpage 100 according to one embodiment of the present invention. The chunk tree 200 has a root labeled "ROOT" and the root has five chunks, each chunk corresponding to one semantically distinct region shown in FIG. 1.

For example, the chunk 210 that corresponds to the header 120 is labeled "DATA_NODE" since the header 120 includes the image 125 and is also annotated with a set of attributes, e.g., "Header" and "Image", indicative of its function. In some embodiments, the set of attributes further includes a group of geometric parameters indicative of the location of the image 125 within the webpage 100, e.g., the coordinate of the top-left corner of the image in pixels, the width and height of the image in pixels. The chunk 230 has attributes like "LHS SideBar" and "On-Site Links" indicative of its function and location. The chunk 240 is labeled "MISC_NODE" and has an attribute "Grid Root" because it is further split into eight child chunks, each child chunk corresponding to one picture and its associated description in the image blocks 140. Note that a child chunk below the chunk 240 is labeled "DATA_NODE" and has a unique attribute "Grid Element" indicating that it is a member of a grid associated with the chunk 240. Similarly, the chunk 250 is annotated with attributes like "RHS SideBar" and "Off-Site Links" because the RHS sidebar 160 includes advertisement blocks pointing to other websites, and the chunk 260 has attributes like "Footer" and "On/Off-Site Links".

If a chunk tree of a webpage as shown in FIG. 2 is available to a search engine, the search engine can more accurately determine the relevance between the webpage and a search query term based upon which semantically distinct region contains the query term. For example, if the query term is contained in the image blocks 140, the webpage 100 should generally be granted a priority higher than another webpage in which the query term is found in one of the advertisement blocks.

However, what is normally available to a search engine is actually a structured or semi-structured document such as an HTML file which does not have a chunk tree embedded therein. The document wound need to be subsequently interpreted line by line by a web browser in order to have a 2-D geometric structure as shown in FIG. 1. Thus, search engines normally cannot distinguish between query terms found in important sections of a page and query terms found in less important sections.

As described below, one embodiment of the present invention is a method for generating a hierarchical data structure like a chunk tree from an HTML file by performing a pseudo-rendering of the HTML file. The resulting hierarchical data structure can be used by a search engine to improve search results, for example by taking into account of the document location of a query term or link, creating a semantically meaningful title for an image, or by constructing more accurate snippets for search results.

Pseudo-rendering a document determines the approximate position and size of each element of the document, without necessarily performing a full rendering of the document. A primary purpose of pseudo-rendering is to determine geometric information for each element of the document and to associate that geometric information with the document's elements in a hierarchical data structure, thereby providing the factual basis for identifying semantically distinct regions of the document and for assigning elements of the document to those regions. In some embodiments, the pseudo-rendering is performed by a pseudo-browser program using a simplified one pass rendering method, thereby achieving pseudo-rendering with minimal computational resources at the possible expense of accuracy. In some embodiments, the geometric information produced by the pseudo-rendering needs to be only approximately accurate, i.e., accurate enough to identify the semantically distinct region to which each element belongs. In another embodiment, pseudo-rendering is achieved using a normal page/document rendering procedure, but the resulting image data is used for determining the geometric information associated with the document's elements rather than for actual display of the document.

System Architecture

Figure 3:
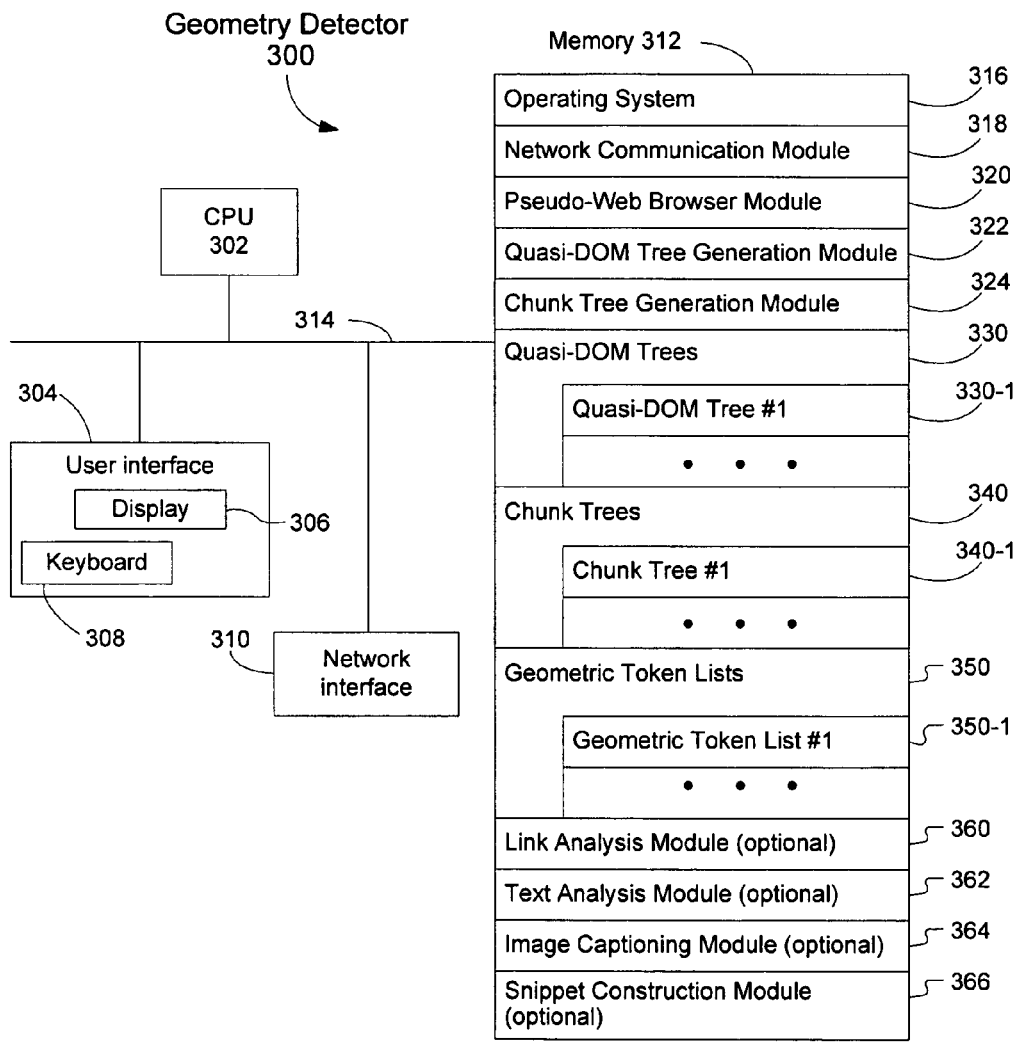
FIG. 3 is a block diagram illustrating a computer-based geometry detector in accordance with one embodiment of the present invention.

FIG. 3 is a block diagram illustrating a computer-based geometry detector 300 in accordance with one embodiment of the present invention. The geometry detector 300 typically includes one or more processing units (CPU's) 302, one or more network or other communications interfaces 310, memory 312, and one or more communication buses 314 for interconnecting these components. The geometry detector 300 optionally may include a user interface 304 comprising a display device 306 and a keyboard 308. Memory 312 may include high speed random access memory and may also include non-volatile memory, such as one or more magnetic disk storage devices. Memory 312 may optionally include one or more storage devices remotely located from the CPU(s) 302. In some embodiments, the memory 312 stores the following programs, modules and data structures, or a subset thereof:

- an operating system 316 that includes procedures for handling various basic system services and for performing hardware dependent tasks;
- a network communication module 318 that is used for connecting the geometry detector 300 to other computers via the one or more communication network interfaces 310 (wired or wireless), such as the Internet, other wide area networks, local area networks, metropolitan area networks, and so on;
- a pseudo-web browser module 320 that is used for pseudo-rendering specified HTML files and generating estimated geometric information for various elements in the HTML file;
- a quasi-DOM tree generation module 322 that is used for generating a quasi-DOM tree for an HTML file, the quasi-DOM tree having multiple nodes and each node corresponding to a syntactic element in the HTML file;
- a chunk tree generation module 324 that is used for converting a quasi-DOM tree of an HTML file into a chunk tree by consolidating the nodes of the quasi-DOM tree in accordance with a set of predefined heuristic rules and the nodes' geometric information;
- one or more quasi-DOM trees 330 generated by the quasi-DOM tree generation module 322, each quasi-DOM tree including multiple nodes corresponding to syntactic and semantic elements of an HTML file and each node having a set of node attributes including a group of geometric parameters derived from the pseudo-rendering of the HTML file;
- one or more chunk trees 340 generated by the chunk tree generation module 324, each chunk tree including multiple chunks, each chunk corresponding to one semantically distinct region of a pseudo-rendered webpage and having a set of chunk attributes indicating the function and location of the semantically distinct region in the pseudo-rendered webpage; and
- one or more geometric token lists 350 generated by the quasi-DOM tree generation module 322, each token list including multiple tokens, each token corresponding to a term, e.g., a word or an image, appearing in the pseudo-rendered webpage and including a set of token attributes representing the location and size of the term and its associated quasi-DOM tree node and chunk tree node.

Each of the above identified modules corresponds to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memory 312 may store a subset of the modules and data structures identified above. Furthermore, memory 312 may store additional modules and data structures not described above.

Figure 4:
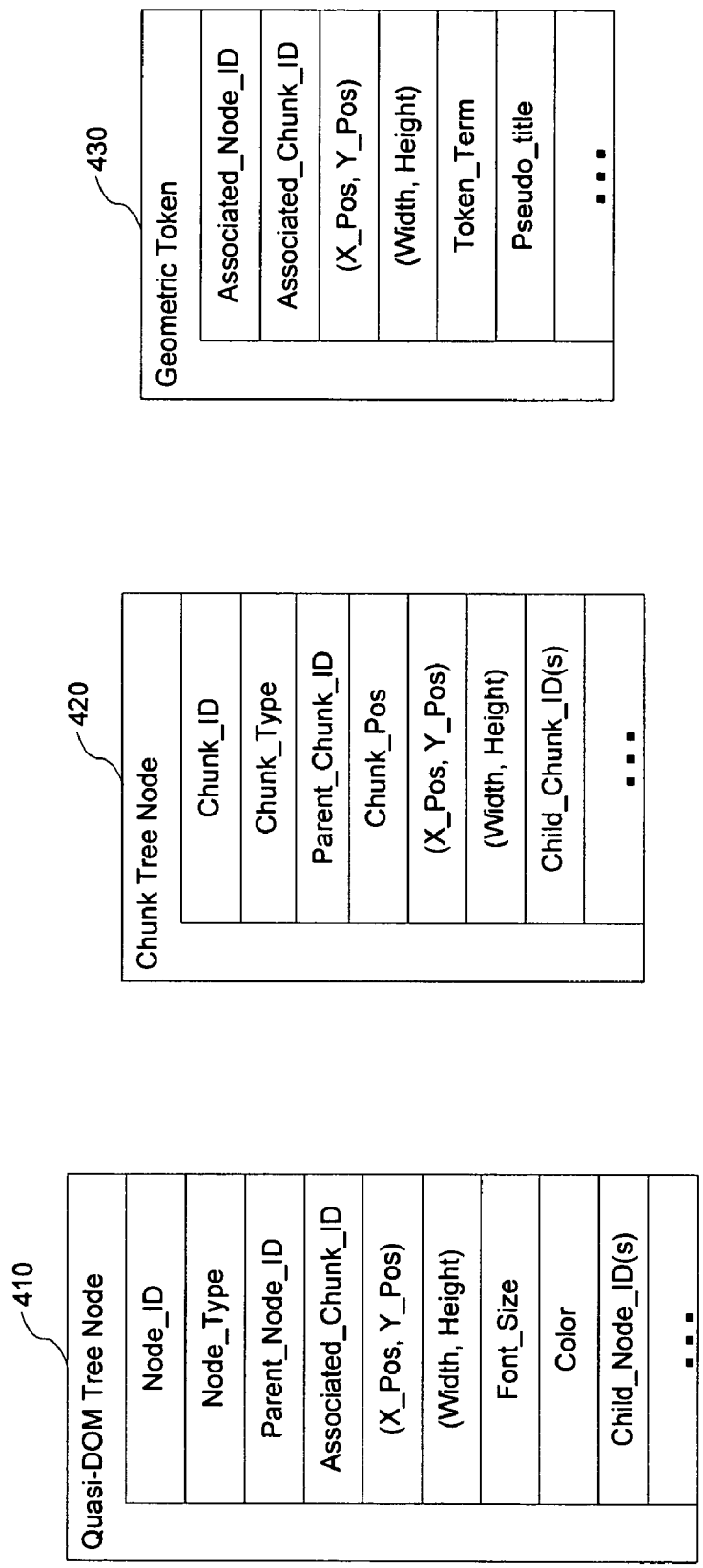
FIG. 4 illustrates exemplary data structures used for storing attributes associated with a quasi-DOM tree node, a chunk tree node and a geometric token, respectively, in accordance with one embodiment of the present invention.

FIG. 4 illustrates exemplary data structures used for storing attributes associated with a quasi-DOM tree node 410, a chunk tree node 420 and a geometric token 430, respectively, in accordance with one embodiment of the present invention.

In particular, in one embodiment, a quasi-DOM tree node 410 includes:
- node_id that uniquely identifies the node among other nodes of the same quasi-DOM tree;
- node_type that indicates what kind of syntactic or semantic element this node is associated with, e.g., "TABLE" for <TABLE> and </TABLE>, "ROW" for <TR> and </TR>, "CELL" for <TD> and </TD>, etc;
- parent_node_id pointing to the current node's parent (if any) on the quasi-DOM tree;
- associated_chunk_id pointing to a chunk tree node in a corresponding chunk tree to which the current node belongs;
- (x_pos, y_pos) indicating the location of the top-left corner of one or more semantic elements associated with the current node in a pseudo-rendered webpage;
- (width, height) indicating the area in number of pixels occupied by the semantic elements in the pseudo-rendered webpage;
- font_size of the text (if any) associated with the current node;
- color of the text (if any) associated with the current node; and
- child_node_id(s) of other nodes in the quasi-DOM tree that are children of the current node, if any.

In another embodiment, a quasi-DOM tree node may include a subset of the above identified fields, may contain additional fields, and may include somewhat different fields providing similar information. For example, geometric information may be provided in several different but equivalent ways. In another example, the set of fields may include the font type of the text, if any, associated with the node.

Since a chunk tree originates from a quasi-DOM tree, it has a set of chunk attributes similar to a quasi-DOM tree node's attributes (see, e.g., the quasi-DOM tree node 410 and the chunk tree node 420 in FIG. 4). However, unlike a quasi-DOM tree that is driven primarily by the syntactic elements of an HTML file, a chunk tree is more closely tied with the semantic elements of a pseudo-rendered webpage. Therefore, there are a few attributes that are unique to a chunk tree node:
- chunk_type that suggests the location and function of a chunk, e.g., sidebar, header, footer, etc; and
- node_type that indicates the type of the node in a chunk tree, e.g., "ROOT" for the root of a chunk tree, "DATA" for nodes containing information such as text, images or links, "STRUCTURAL" for nodes that do not contain such information, or "GRID ELEMENT" for nodes corresponding to elements belonging to a list or array.

In some embodiments, each chunk tree node also includes a Chunk_ID, and Parent_Chunk_ID (identifying a parent node, if any, geometric fields such as (x_pos, y_pos) and (width, height), and child_chunk_ID(s), or a subset thereof.

In some embodiments, the two data structures 410 and 420 are merged into a single data structure which is shared by the quasi-DOM tree and the chunk tree.

Finally, in some embodiments, a geometric token 430 is created for any word or image appearing in the pseudo-rendered webpage. The geometric token 430 may include the following fields, or a subset thereof:
- associated_node_id that points to a leaf node of a quasi-DOM tree whose associated semantic element includes the geometric token;

associated_chunk_id that points to a leaf node of a chunk tree whose associated semantically distinct region includes the geometric token;

(x_pos, y_pos) indicating the location of the top-left corner of the geometric token in a pseudo-rendered webpage;

(width, height) indicating the area in number of pixels occupied by the geometric token in the pseudo-rendered webpage;

token_term that may be a word, an image, a link, etc.; and a pseudo-title flag, indicating that the token is a word that may be used as the pseudo-title or part of the pseudo-title of the chunk in which the associated chunk tree leaf node is found.

Process and Example

Figure 5:
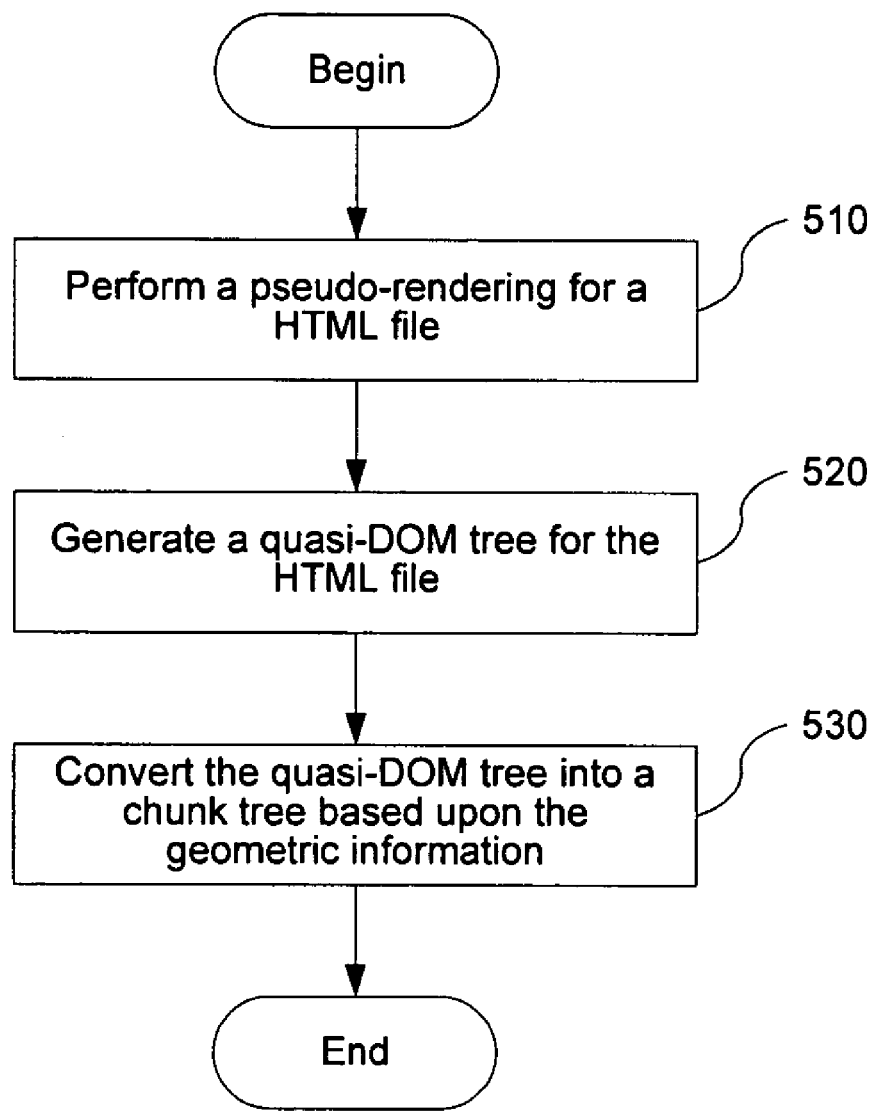
FIG. 5 is an overview flowchart of major actions by the geometry detector according to one embodiment of the present invention.

FIG. 5 is an overview flowchart of major actions by the geometry detector according to one embodiment of the present invention.

After receiving a document, for example in the form of an HTML file or data structure, the geometry detector first performs a pseudo-rendering of the HTML file (510). This action emulates the operation of a real web browser by interpreting the HTML file line by line and creating a webpage for the HTML file in the memory, the webpage including multiple semantically distinct region as shown in FIG. 1. Note that the pseudo-rendered webpage is used only for identifying geometric information of a semantically distinct region, not for real-world visualization. Therefore, the geometry detector does not have be as accurate as a real web browser. While, a real web browser typically needs to scan an HTML file twice to generate a webpage, the geometry detector may need only one pass of the HTML file to create a pseudo-rendered webpage, which reduces the computational cost of determining geometric information for the elements of the document.

The geometry detector also generates a quasi-DOM tree that includes multiple nodes (520), each node corresponding to one of the semantic and syntactic elements of the HTML file. A standard document object model (DOM) tree usually contains a large number of nodes, e.g., several hundred nodes, most of which correspond to purely structure-oriented HTML tags like "<TABLE>", "<TR>", "<TD>", etc. In contrast, the quasi-DOM tree eliminates those syntactic elements which are totally irrelevant to the geometric structure of the pseudo-rendered webpage, and creates some nodes which do not have a direct counterpart element in the HTML file, e.g., splitting paragraphs separated by significant vertical gaps into multiple semantic elements. More than that, each node of the quasi-DOM tree is associated with a set of attributes including geometric information derived from the pseudo-rendered webpage. In some embodiments, operation 520 is performed before operation 510, which is used to populate the nodes of the quasi-DOM tree with geometric information.

Figure 7:
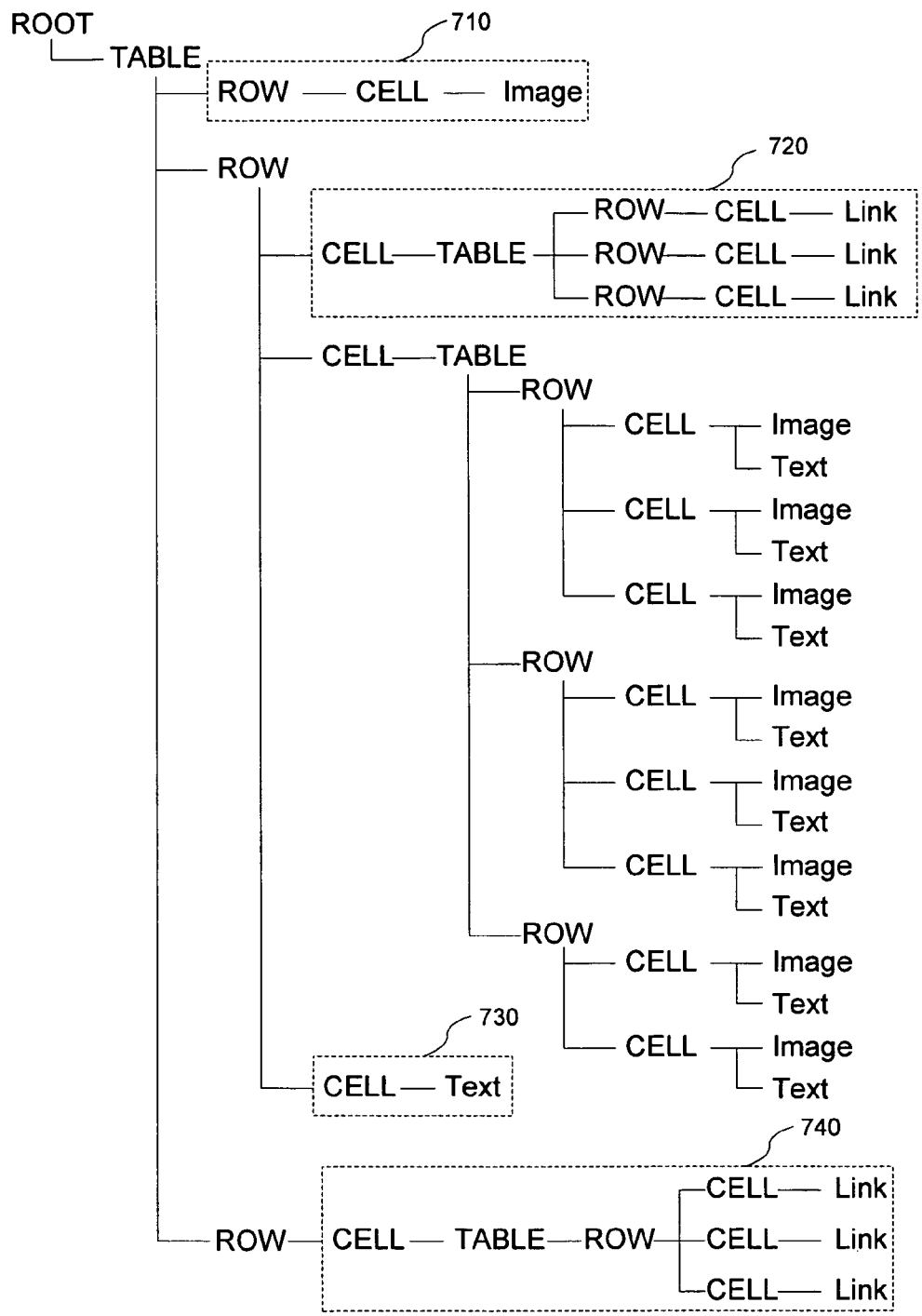
FIG. 7 is a quasi-DOM tree of the exemplary webpage according to one embodiment of the present invention.

FIG. 7 is a quasi-DOM tree 700 of the exemplary webpage 100 according to one embodiment of the present invention. The quasi-DOM tree 700 has one root node labeled "ROOT", and all other nodes are direct or indirect descendants of the root node. Non-root and non-leaf nodes usually correspond to syntactic elements in the HTML file, e.g., "TABLE", "ROW", or "CELL", while leaf nodes correspond to semantic elements in the file, e.g., "Image", "Text", or "Link". Note that the child of a "CELL" node may be a leaf node (e.g., block 710 or block 730) or a sub-tree including multiple non-leaf nodes (e.g., block 720 or block 740). In the latter case, the sub-tree itself may include its own set of "TABLE", "ROW", and "CELL" nodes, each "CELL" node having one or more child leaf nodes. In some other embodiments, the parent of a leaf node may not necessarily be a "CELL" node. For instance, the parent node could be a "TABLE" node, a "ROW" node or any node associated with a syntactic element in an HTML file.

It is worth noting that, for illustrative purposes, not all attributes associated with a quasi-DOM tree have been listed in FIG. 7. For example, FIG. 7 does not show the geometric information, e.g., (x_pos, y_pos) or (width, height), associated with each node. However, it will be understood by one skilled in the art that each node shown in FIG. 7 is associated with a set of attributes listed in the data structure 410 of FIG. 4. Relying upon these attributes, the geometry detector converts the quasi-DOM tree into a chunk tree (530).

Figure 6:
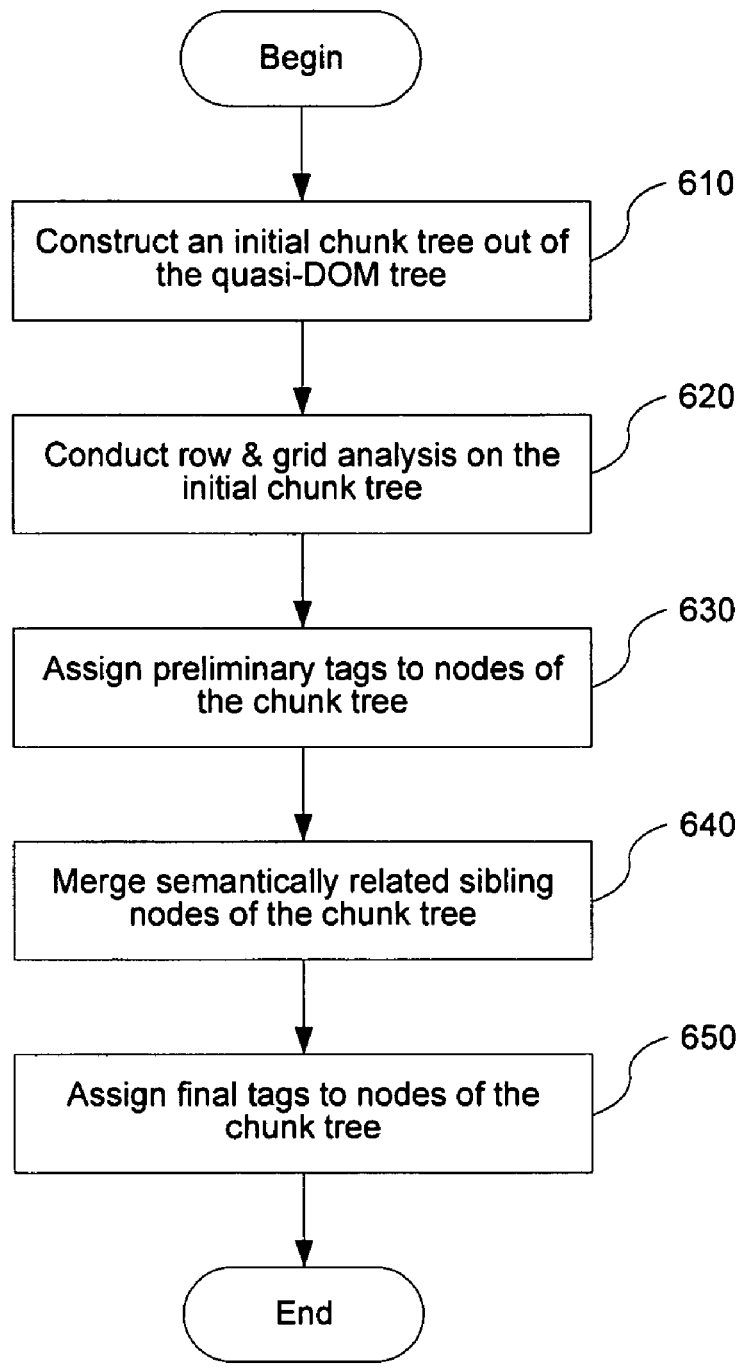
FIG. 6 is a flowchart illustrating further details of an algorithm of converting a quasi-DOM tree into a chunk tree according to one embodiment of the present invention.

FIG. 6 is a flowchart illustrating a method of converting a quasi-DOM tree into a chunk tree according to one embodiment of the present invention. The chunk tree at different stages of the method is shown in FIGS. 8A-8D.

First, the geometry detector constructs an initial chunk tree out of the quasi-DOM tree (610). In particular, the geometry detector identifies interesting nodes on the quasi-DOM tree. In some embodiments, an interesting node is one that contains actual text or image, as opposed to those purely syntactic elements. At this stage, the geometry detector may also collapse a child node which does not have any siblings into its parent node.

Figure 8A:
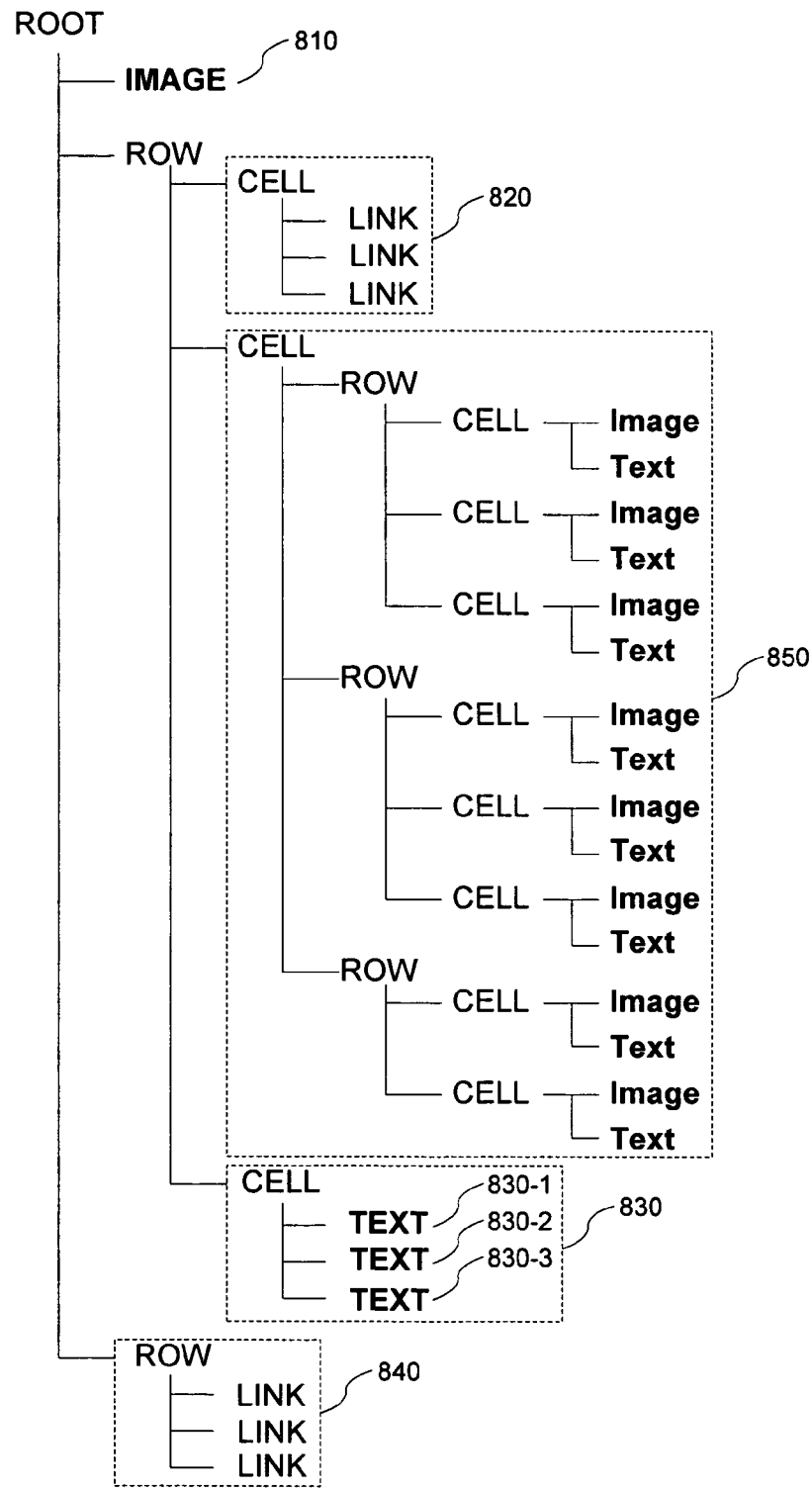
FIGS. 8A-8D are an example illustrating the chunk tree at different stages according to one embodiment of the present invention.

Referring again to FIG. 7, since each parent node in the block 710, "ROW" and "CELL", has only one child node, "CELL" and "Image", respectively, this quasi-DOM tree branch collapses into a single node 810 labeled "IMAGE" in FIG. 8A. Similarly, the block 720 is "shrunk" (or reduced) into the block 820 and the block 740 into the block 840. As a result, the initial chunk tree 800 has fewer nodes than the quasi-DOM tree 700. Note that the block 730 is not shrunk, but expanded into the block 830. This is because the geometry detector, after identifying large vertical gaps within the RHS sidebar 150, determines that the RHS sidebar 150 includes three semantically distinct elements and therefore splits the "Text" leaf node in the block 730 into three "TEXT" nodes 830-1, 830-2 and 830-3 in the block 830, each node having its own set of geometric parameters.

Second, the geometry detector conducts a row and grid analysis of the initial version of the chunk tree (620). A purpose of this analysis is to establish among selected portions of an HTML file a logical relationship that associates a group of semantic elements together as shown in a corresponding webpage. For example, the image blocks 140 in FIG. 1 correspond to an image gallery that include an array of related pictures and their associated descriptions. However, this logical relationship between the pictures is not well represented by the block 850 in the initial chunk tree. Therefore, the geometry detector may highlight the logical relationship between the pictures by examining the geometric parameters associated with each picture and description through row and grid analysis.

Figure 9A:
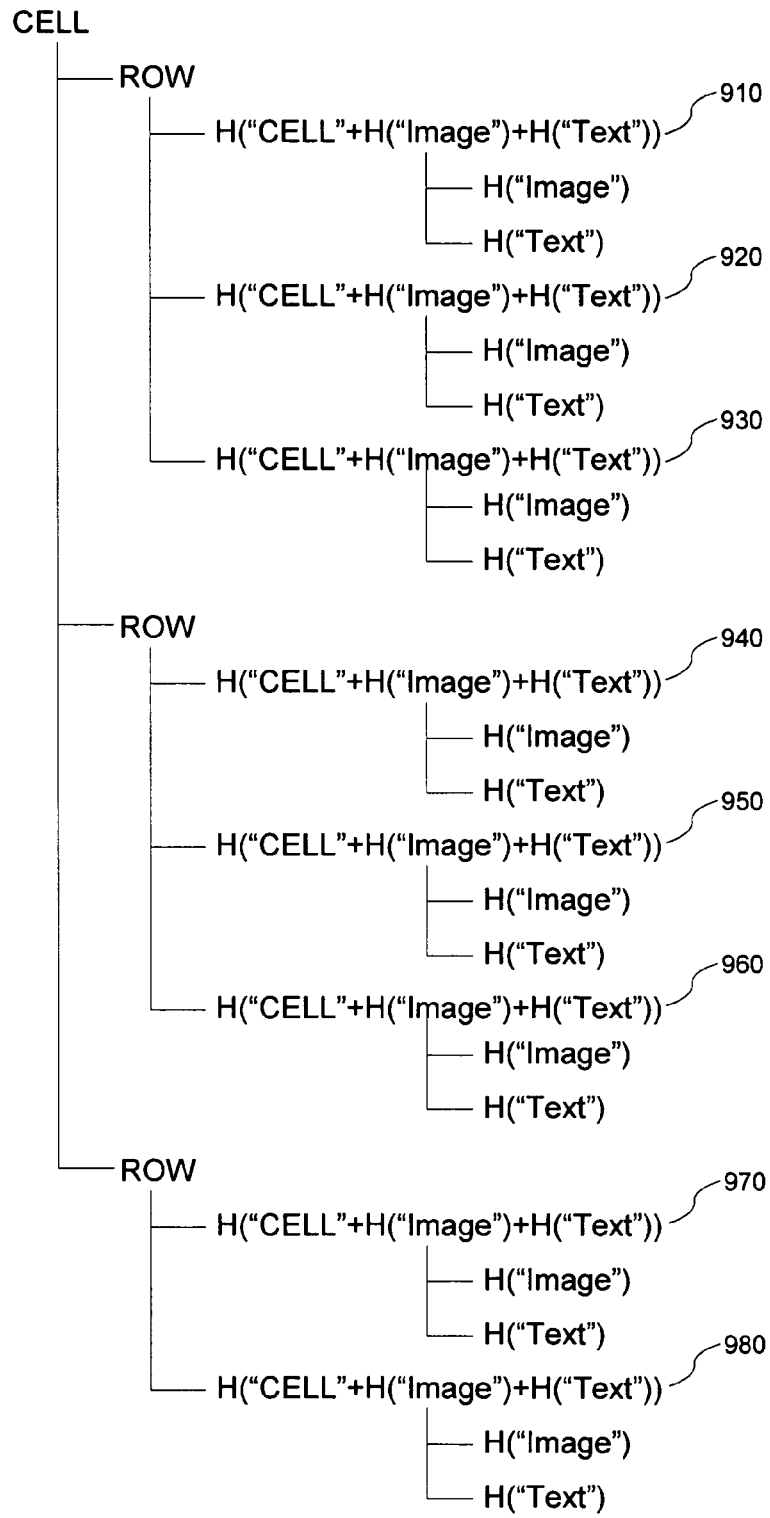
FIGS. 9A and 9B are an example illustrating an algorithm of row and grid analysis according to one embodiment of the present invention.
Figure 9B:
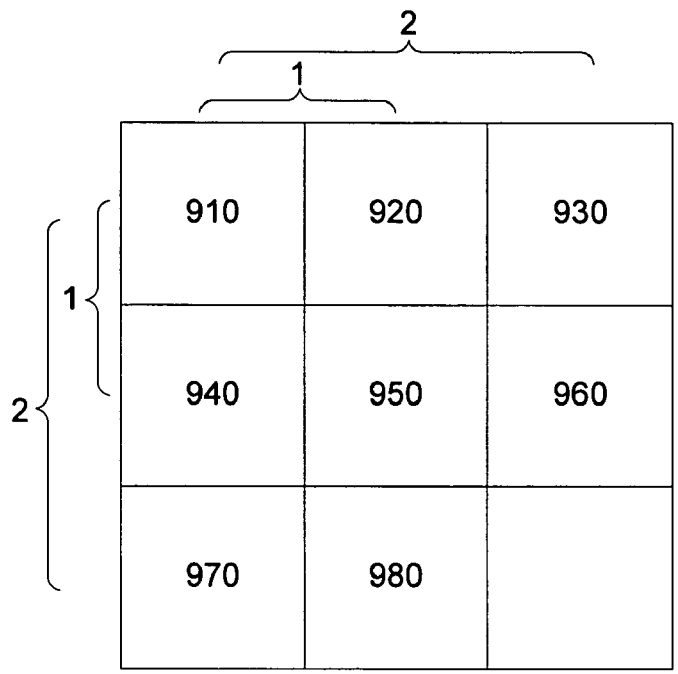

FIGS. 9A and 9B are an example illustrating a row and grid analysis method or process according to one embodiment of the present invention. The analysis method focuses the existence of any kind of periodic or semi-periodic relationship between the pictures. A semi-periodic relationship among a set of elements is one in which at least a threshold percentage of a set of elements are positioned at approximately regular intervals. The interval pattern can be defined to allow for a predefined amount of positioning variation, and the threshold can be selected to allow some positions in the pattern to be either unoccupied or partially occupied by elements not fitting the pattern. Finding a set of elements to be compatible with a grid pattern, even if the elements are only semi-periodically positioned, is very beneficial in terms of grouping the elements into a single chunk, which forms or is part of a single semantic region of the document.

As shown in FIG. 9A, the geometry detector first replaces each leaf node in the block 850 with a hash code based on the content type of the leaf node. For example, an "Image" leaf node is replaced with a hash code of the expression "Image" or H("Image"), and a "Text" leaf node is replaced with a hash code of the expression "Text" or H("Text"). Accordingly, each of the eight parent nodes 910-980 is associated with a hash code that depends upon both its child nodes' hash codes and its own label "CELL".

As shown in FIG. 9B, the eight hash codes are assigned to eight elements of a 2-D array according to their respective geometric information produced at the pseudo-rendering stage 510. Two hash codes are selected from two distinct elements of the 2-D array and then compared to determine whether they match each other or not in accordance with a predefined selecting pattern. In a first selecting pattern, the geometry detector selects all pairs of vertically adjacent hash codes that are deemed to have a vertical distance of "1". In a second selecting pattern, the geometry detector selects all pairs of hash codes that have a vertical distance of "2". Similar selecting patterns are adapted in the horizontal direction. As a result, two tables are shown in FIG. 9B, one containing a result indicating the number of matching pairs and the total number of candidate pairs in the horizontal direction and the other containing a result indicating similar information for pairs in the vertical direction.

The data in the two tables demonstrate that many pairs of selected hash codes match each other, 83% in the case of distance of "1" and 67% in the case of distance of "2". These percentages are sufficiently high to indicate that the elements are organized in a periodic or semi-periodic manner. In other words, the underlying pictures and descriptions in the image blocks 140 are geometrically compatible with each other. Therefore, these semantic elements can be associated together with a 3×3 two-dimensional grid structure, each grid element corresponding to a picture and a description. Note that the same algorithm, when applied to a group of vertically-spaced semantic elements, can generate a 1-D list structure. It is also worth noting that the row and grid analysis as shown in FIGS. 9A and 9B is a heuristic-based approach that is flexible and robust enough to detect the geometric relationship of a set of elements even if the relationship is not strictly periodic, but only semi-periodic. As a result, the row and grid analysis is robust against "noise", such as small deviations from periodic positioning and small numbers of "missing" elements in a pattern. For example, a missing element at the lower-right corner of the array in FIG. 9B does not prevent the row and grid analysis from determining that the elements in this example are organized in a 3×3 two-dimensional grid.

Figure 8B:
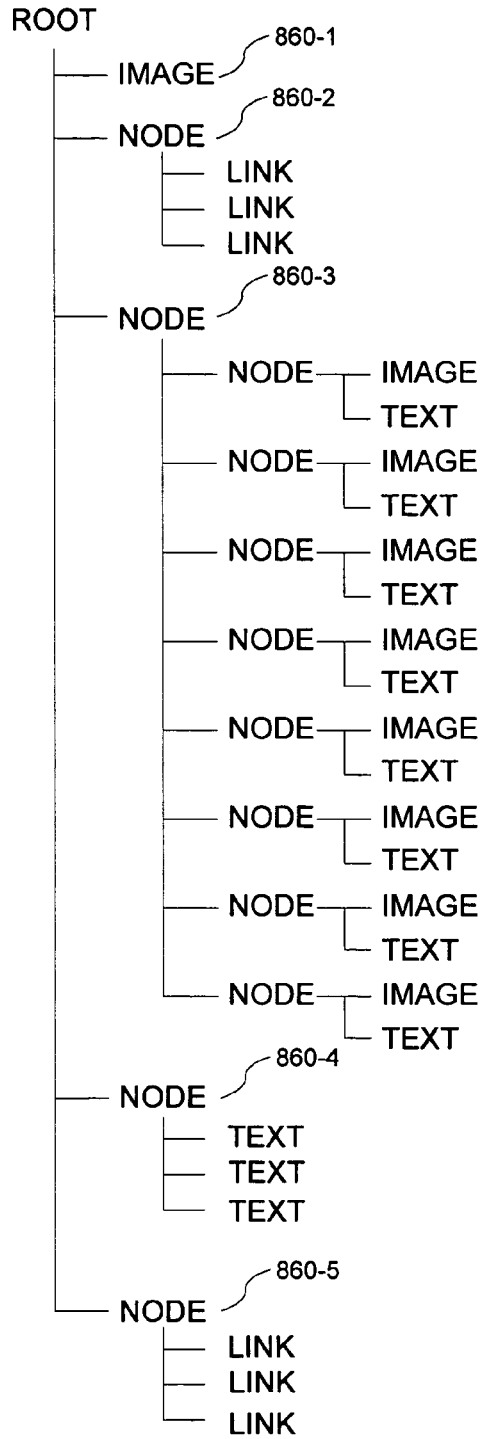
Figure 8C:
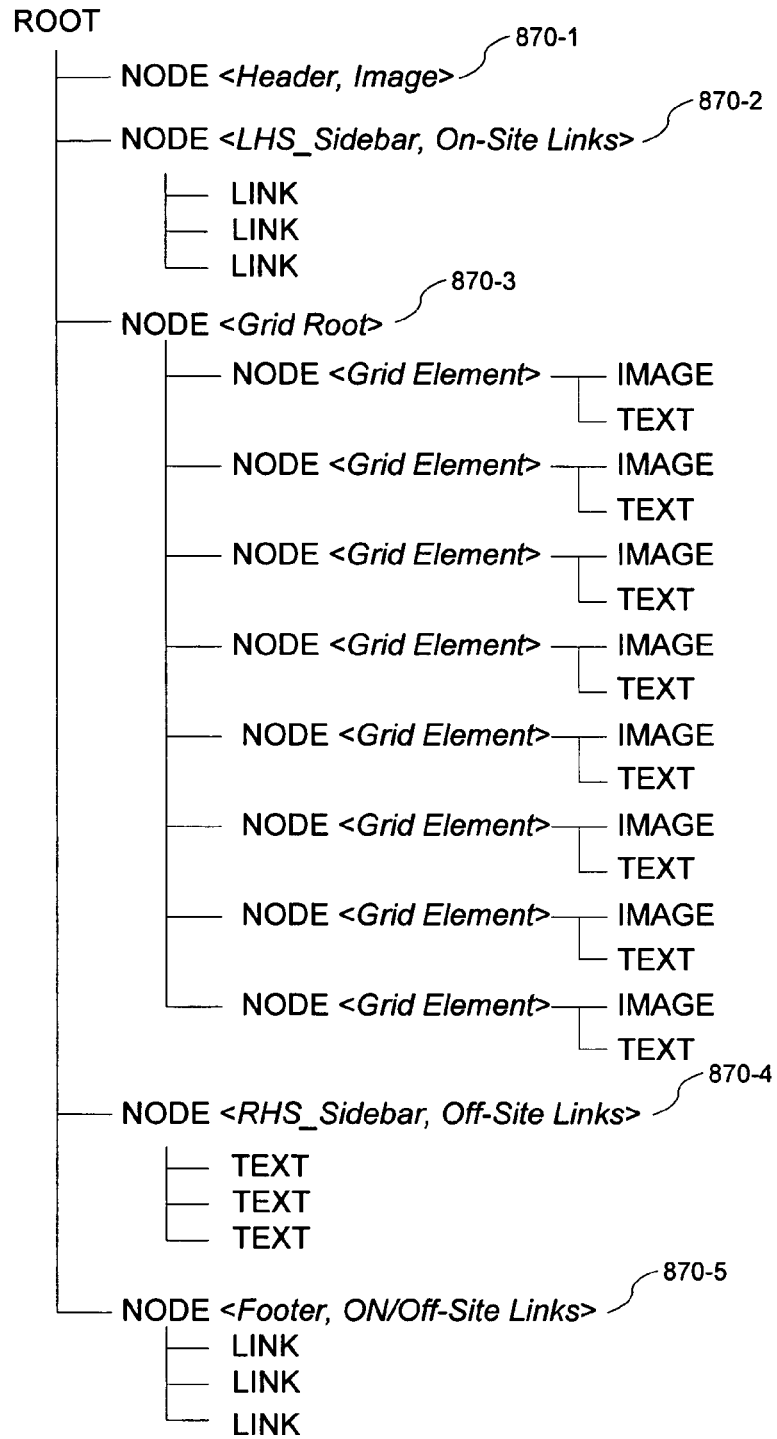
Figure 8D:
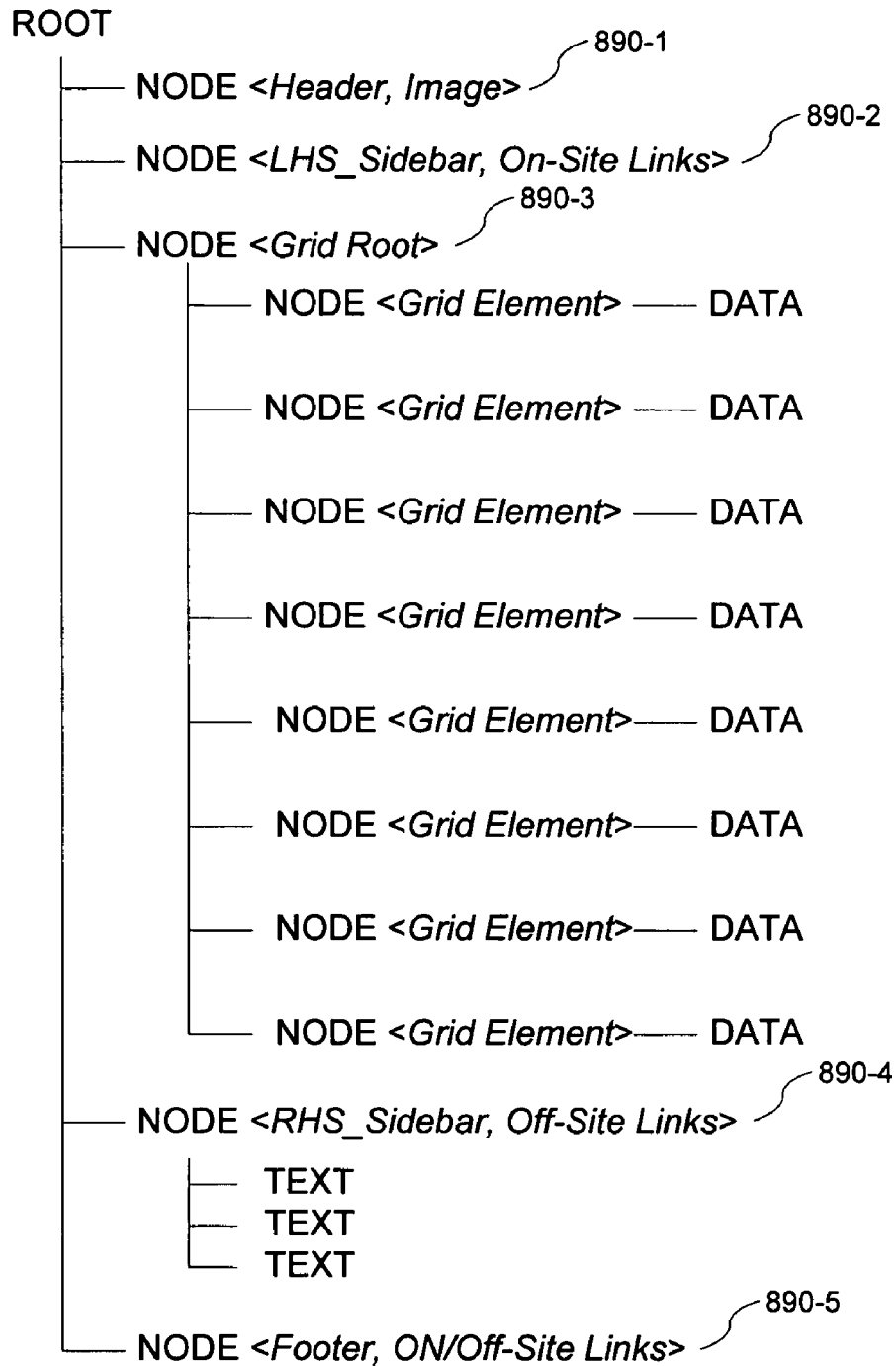

After row and grid analysis, the chunk tree is further simplified by grouping together each set of elements found to fit a periodic or semi-periodic pattern, as shown in FIG. 8B. There are five child nodes associated with the root node, 860-1 to 860-5, each child node corresponding to a rectangular region in the webpage 100. For example, the child node 860-1 is associated with the header 120, and the child node 860-2 is associated with the LHS sidebar 130, etc. As a result, the revised chunk tree is starting to reflect the geometric structure of the webpage 100. Note that the three intermediate nodes separating the eight grid elements in FIG. 8A have been eliminated by the row and grid analysis and the eight grid elements become sibling nodes in FIG. 8B. Further, whenever nodes in the chunk tree are combined, their geometric information is also combined so that the revised nodes represent the position and extent of each combined or revised node.

Third, the geometry detector assigns preliminary tags to nodes of the chunk tree after the chunk tree has been simplified by the row and grid analysis (630). The preliminary tags are assigned according to the geometric information associated with each node. For example, in FIG. 8C, the node 870-1 has two tags, "Header" indicating that the associated semantic element probably serves as the header of a webpage since it is located at the top of the webpage and "Image" indicating that the associated semantic element is an image, e.g., a logo image. The node 870-2 has two tags, "LHS_Sidebar" suggesting that this node corresponds to semantic elements located on the left hand side of the webpage and "On-Site Links" indicating that these elements are actually links to another webpage on the same website. The node 870-3 is tagged as "Grid_Root" since its child nodes are eight grid elements according to the row and grid analysis conducted previously at step 620. The node 870-4 is similar to the node 870-2 except that it is located on the right hand side of the webpage and all the links are off-site links. In some embodiments, the node 870-4 may have another tag such as "Adbanner" suggesting that its elements are advertisement blocks sponsored by another website. Finally, the node 870-5 is tagged as "Footer" due to the fact that it is located at the bottom of the webpage and "On/Off-Site Links" if it includes both on-site and off-site links.

Fourth, the geometry detector merges semantically related sibling nodes of the chunk tree according to their respective preliminary tags and geometric information (640). For example, the three sibling leaf nodes associated with the node 870-2 in FIG. 8C have been merged into the node 890-2 in FIG. 8D. This is, in part, due to the fact that the two tags "LHS_Sidebar" and "On-Site Links" are sufficient in characterizing the three individual semantic elements within the region, and there are no attributes that substantially separate the three links at the leaf node. Similarly, the two leaf nodes associated with a grid element are merged into a single node label "DATA" and the three links in the footer region are also merged into the footer node 890-5. However, the three leaf nodes labeled "TEXT" that are children of the node 890-4 remain separate because each node may be associated with a distinct type of advertisement. For example, if the webpage 100 is an image gallery, one of the advertisement blocks may provide paper printing service and the other may sell digital camera, which are sufficiently different to remain as separate nodes. But in general, the chunk tree is further simplified after merging sibling nodes.

Finally, the geometry detector finishes chunk tree construction by assigning final tags to the chunk tree nodes (650). The chunk tree, as shown in FIG. 2, has only 17 nodes in contrast to the quasi-DOM tree that has 58 nodes as shown in FIG. 7. Not only is the chunk tree simpler than the quasi-DOM tree, it is also more intuitive. Specifically, the chunk tree has a root node and the root node has five child nodes, 210-260, each child node corresponding to a semantically distinct region shown in FIG. 1. Among them, the nodes 210, 230 and 260 are labeled "DATA_NODE" because each of them includes certain type of data (e.g., image, text or links). In contrast, the nodes 240 and 250 are labeled "MISC_NODE" and each of these two nodes has a group of child nodes that are labeled "DATA_NODE". The child nodes have not been merged into their respective parent nodes for the reasons discussed above.

In some embodiments, during the course of chunk tree construction, the geometry detector identifies a pseudo-title for each chunk in the chunk tree. For example, during preliminary tagging (630), the geometry detector tags text in a chunk that would appear prominently when the document is rendered, e.g., in large font size or unique font type or located at the beginning of a paragraph as a candidate pseudo-title for the chunk. In some embodiments, the geometry detector searches for text that satisfies predefined criteria with respect to appearing prominently if the document were rendered for display, and identifies such text as a pseudo-title for the associated chunk.

After preliminary tagging, the geometry detector checks whether a candidate pseudo-title of a parent chunk could reasonably be considered to be a pseudo-title for the children of that chunk according to the geometric information of the parent and child chunks. For example, if the pseudo-title is an isolated section of text that is directly above the child chunks, it will be considered to be the pseudo-title of the child chunks as well.

During sibling merge (640), the geometry detector checks if the first sibling of a sequence may be reasonably considered a pseudo-title for the other siblings. For example, the first row of a list of links in a sidebar is often the boldfaced title for that sidebar region. As a result, the chunk tree includes not only a map linking various semantically distinct regions in a webpage, but also includes an appropriate title for each region for which a pseudo-title has been found.

In some embodiments, after completion of chunk tree construction, the geometry detector generates a geometric token list for an HTML file being pseudo-rendered. The geometric token list includes multiple members, and each one may be a word, an image or a link in the HTML file. For example, if a word is considered part of the pseudo-title of a semantically distinct region, this word will be marked accordingly in the data structure 430 as shown in FIG. 4.

GENERAL

There are many important applications that can benefit from the chunk tree. For illustrative purposes, the following is an exemplary list of such applications, each of which may be implemented on either the same computer system or a different computer system than the geometry detector 300.

Link analysis module (360). Most documents on the Internet either have links referring to other documents, or are referred to by other documents, or both. A link analysis module, or set of instructions 360 (sometimes called a page ranker) helps to determine a document's popularity on the Internet. A document having more referring documents is often granted a higher weight by a search engine. On the other hand, as discussed above, using the analysis tools of the present invention, different links found in different semantically distinct regions may be assigned different weights. Therefore, a link from one document to another document can be weighted in accordance with the semantically distinct region in which the link is located in order to better characterize the popularity of target document.

Text analysis module (362). Similar to links appearing in different semantic regions being assigned different weights, a text analysis module 362 may assign identical text different weights when that text is found in different semantic regions of a document. Referring to FIG. 1, if a query term finds its match in the image blocks 140 instead of the footer 160, the webpage should be given a higher query score than if the term were found in the footer, and thus a higher position in the list of matching documents, because the image blocks 140 are usually the primary target of a viewer.

Image captioning module (364). Generally speaking, text close to an image is more likely relevant to the image than text farther away from the image. Since every token in a webpage has a set of associated geometric parameters, it is possible to identify text that is close to an image and therefore create a caption for the image, which may subsequently be used in applications like image search. An image captioning module 364 with such image captioning functions may be implemented as part of a search engine backend system for generating a searchable database of information about documents, including images.

Snippet construction module (366). When one or more chunks in a document's chunk tree are assigned a pseudo-title, an application may rely on the pseudo-titles to construct a more accurate snippet of the document that captures the major topic(s) of the document and includes at least one of the pseudo-titles. A "snippet" is text selected from a document (or other set of information) as being either representative of the document or text from the document that matches and surrounds one or more query terms or the like. A snippet construction module 366 may be implemented as part of a search engine, email system, or the like.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A method of partitioning a structured document, comprising:
   on a server system having one or more processors that execute programs stored in the memory of the server system, under the control of procedures executed by the server system:
   translating the document into an initial hierarchical data structure in accordance with syntactic elements defined in the document, the initial hierarchical data structure including a plurality of nodes corresponding to the syntactic elements;
   annotating each node with a set of attributes including geometric parameters, wherein the geometric parameters are assigned in accordance with a pseudo-rendering of the document that identifies locations of semantically distinct regions of the document in accordance with the syntactic elements in the document; and
   merging the nodes in the initial hierarchical data structure into a tree of nodes in accordance with their respective attributes, including the geometric parameters, and a set of predefined rules, the set of predefined rules including rules for merging nodes having nearby positions in the pseudo-rendering and/or having compatible attributes.

2. The method of claim 1, including assigning labels to the nodes in the tree, the assigned labels indicating a heuristically determined function or information type associated with each node in the tree.

3. The method of claim 1, wherein the document is an HTML file and the syntactic elements are HTML tags.

4. The method of claim 1, wherein the initial hierarchical data structure is a quasi-DOM tree.

5. The method of claim 1, wherein the geometric parameters associated with a node include location and dimension of a semantic element in the pseudo-rendered document.

6. The method of claim 5, wherein the geometric parameters include font size and color if the semantic element is a text string.

7. The method of claim 1, wherein the set of attributes of a node include a pseudo-title of a semantic element in the pseudo-rendered document associated with the node.

8. The method of claim 7, wherein the pseudo-title of the semantic element is selected from text that satisfies predefined criteria with respect to appearing prominently if the document were rendered for display.

9. The method of claim 1, wherein the merging of the nodes in the initial hierarchical data structure includes a plurality of actions selected from the group consisting of:
  merging a child node into its parent node if the child node is the only child of the parent node;
  expanding a child node into multiple child nodes if the child node is associated with multiple semantic elements;
  identifying a group of nodes sharing a set of compatible attributes, the compatible attributes including that semantic elements associated with the group of nodes having similar geometric parameters and the semantic elements appearing in the pseudo-rendered document in a periodic or semi-periodic manner;
  assigning a preliminary tag to a node, the preliminary tag identifying function and location of semantic elements in the pseudo-rendered document associated with the node in accordance with their respective geometric information;
  merging sibling nodes having compatible preliminary tags into their parent node; and
  assigning a final tag to each node of the tree of nodes.

10. The method of claim 1, wherein the tree of nodes includes a plurality of chunks corresponding to multiple semantically distinct regions in the pseudo-rendered document.

11. The method of claim 10, including assigning links in a first semantically distinct region a different weight than links in a second semantically distinct region in the document and performing a computation using said assigned weights.

12. The method of claim 10, including assigning text in a first semantically distinct region a different weight than text in a second semantically distinct region in the document and performing a computation using said assigned weights.

13. A method of partitioning a document having a certain content into a set of semantically distinct regions, comprising:
  on a server system having one or more processors that execute programs stored in the memory of the server system, under the control of procedures executed by the server system:
    generating a hierarchical data structure corresponding to a plurality of syntactic elements of the document, and determining a set of geometric parameters for each syntactic element of at least a subset of the plurality of syntactic elements, wherein the set of geometric parameters are determined in accordance with a pseudo-rendering of the document that identifies locations of semantically distinct regions of the document in accordance with the syntactic elements in the document; and
    merging the syntactic elements into a set of semantically distinct regions in accordance with their respective geometric parameters and a set of predefined heuristic rules, each section including one or more semantic elements of the document.

14. The method of claim 13, wherein the merging further comprises:
  selecting a set of nodes from the hierarchical data structure, each selected node including at least one semantic element of the document;
  expanding the selected nodes into the set of semantically distinct regions by combining each selected node with other nearby nodes of the hierarchical data structure according to their respective sets of geometric parameters; and
  assigning a label to each of the semantically distinct regions, the label indicating the function and location of the semantically distinct region.

15. The method of claim 13, including assigning links in a first semantically distinct region a different weight than links in a second semantically distinct region in the document and performing a computation using said assigned weights.

16. The method of claim 13, including assigning text in a first semantically distinct region a different weight than text in a second semantically distinct region in the document and performing a computation using said assigned weights.

17. A system for partitioning a structured document, comprising:
  one or more processors for executing programs; and
  a geometry detector to execute on the one or more processors;
  the geometry detector further comprising:
    a first module or set of instructions for performing a pseudo-rendering of a document in accordance with syntactic elements in the document;
    a second module or set of instructions for generating an initial hierarchical data structure for the document, the initial hierarchical data structure including a plurality of nodes corresponding to the syntactic elements of the document, each node of the plurality of nodes having an associated set of attributes derived from the pseudo-rendered document wherein the associated set of attributes include geometric parameters that are assigned in accordance with a pseudo-rendering of the document that identifies semantically distinct regions of the document in accordance with the syntactic elements in the document; and
    a third module or set of instructions for converting the initial hierarchical data structure into a final hierarchical data structure in accordance with a set of predefined rules, the final hierarchical data structure having a plurality of chunks, each chunk corresponding to a semantically distinct region of the pseudo-rendered document.

18. The system of claim 17, wherein the document is an HTML file and the syntactic elements are HTML tags.

19. The system of claim 17, wherein the set of attributes of a node of the initial hierarchical data structure includes geometric parameters of a semantic element of the document in accordance with the pseudo-rendering of the document.

20. The system of claim 19, wherein the set of attributes includes font size and color if the semantic element is a text string.

21. The system of claim 19, wherein the set of attributes includes a pseudo-title of the semantic element in the document.

22. The system of claim 17, wherein the third module or set of instructions includes a plurality of instructions selected from the group consisting of:

instructions for merging a child node into its parent node in the initial hierarchical data structure if the child node is the only child of its respective parent node;

instructions for expanding a child node into multiple child nodes if the child node is associated with multiple semantic elements;

instructions for identifying a group of nodes sharing a set of compatible attributes, the compatible attributes including that semantic elements associated with the group of nodes having similar geometric parameters and the semantic elements appearing in the pseudo-rendered document in a periodic or semi-periodic manner;

instructions for annotating each chunk of the final hierarchical data structure with an initial label in accordance with its associated semantically distinct region in the pseudo-rendered document;

instructions for merging sibling chunks of the final hierarchical data structure into a single chunk if their initial labels and geometric parameters are compatible; and instructions for assigning each chunk of the final hierarchical data structure a final label indicative of the function and location of its associated semantically distinct region in the pseudo-rendered document.

* * * * *

UNITED STATES PATENT AND TRADEMARK OFFICE
CERTIFICATE OF CORRECTION

| | | |
|---|---|---|
| PATENT NO. | : 7,913,163 B1 | Page 1 of 1 |
| APPLICATION NO. | : 10/947702 | |
| DATED | : March 22, 2011 | |
| INVENTOR(S) | : Yonatan Zunger | |

It is certified that error appears in the above-identified patent and that said Letters Patent is hereby corrected as shown below:

At Column 12, Line 62, please insert -- merged -- before the word nodes.

At Column 13, Line 2, please insert -- merged -- before the word nodes.

At Column 13, Line 43, please insert -- merged -- before the word nodes.

At Column 13, Line 44, please insert -- merged -- before the word nodes.

Signed and Sealed this
Thirty-first Day of May, 2011

David J. Kappos
*Director of the United States Patent and Trademark Office*